(12) United States Patent
Buchwitz et al.

(10) Patent No.: US 7,658,254 B2
(45) Date of Patent: Feb. 9, 2010

(54) SYSTEM AND METHOD FOR CLEARING CRUSH SPACE IN A VEHICLE THROUGH THE USE OF ACTIVE COMPONENTS

(75) Inventors: Joseph Lee Buchwitz, Huntington Woods, MI (US); Noah Barlow Mass, Ann Arbor, MI (US); Venkat Lakshminarayan, Ann Arbor, MI (US); Gennadiy Goldenshteyn, Dearborn, MI (US); Andrew Charles Samyn, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 435 days.

(21) Appl. No.: 11/753,089

(22) Filed: May 24, 2007

(65) Prior Publication Data

US 2008/0290642 A1 Nov. 27, 2008

(51) Int. Cl.
*B60R 21/01* (2006.01)

(52) U.S. Cl. .................. 180/232; 180/274; 280/748; 74/512

(58) Field of Classification Search .............. 180/271, 180/274, 232; 280/784, 748; 74/512; *B60R 21/01*
See application file for complete search history.

(56) References Cited

U.S. PATENT DOCUMENTS

| | | | | |
|---|---|---|---|---|
| 3,521,724 | A | * | 7/1970 | Mayer ..................... 280/777 |
| 5,476,151 | A | * | 12/1995 | Tsuchida et al. ........... 180/274 |
| 5,634,337 | A | | 6/1997 | Gautier et al. |
| 5,797,264 | A | | 8/1998 | Verbo et al. |
| 6,079,207 | A | | 6/2000 | Stadler et al. |
| 6,269,900 | B1 | | 8/2001 | Adams et al. |
| 6,276,483 | B1 | * | 8/2001 | Sinnhuber et al. ........... 180/274 |
| 7,066,515 | B2 | * | 6/2006 | Pierce et al. ................. 296/21 |
| 7,124,851 | B2 | | 10/2006 | Smith et al. |
| 7,232,003 | B2 | * | 6/2007 | Burkle et al. ............... 180/274 |
| 2007/0051550 | A1 | * | 3/2007 | Averdiek et al. ............ 180/274 |

FOREIGN PATENT DOCUMENTS

| | | | |
|---|---|---|---|
| EP | 0 315 598 | A1 * | 5/1989 |
| GB | 2 230 493 | A | 10/1990 |
| WO | 0050270 | A1 | 8/2000 |

OTHER PUBLICATIONS

Search Report, dated Aug. 29, 2008, 1 page.

\* cited by examiner

*Primary Examiner*—Ruth Ilan
(74) *Attorney, Agent, or Firm*—Fredrick Owens; Brooks Kushman P.C.

(57) ABSTRACT

A system for clearing crush space in an automotive vehicle, the system including a vehicle having a passenger compartment, an impact displaced component assembled to the vehicle in a spaced relationship to the passenger compartment, an intervening component mounted on the vehicle between the passenger compartment and the impact displaced component, an active component secured to the vehicle in close proximity to the intervening component, a controller mounted on the vehicle, the controller activating the active component when the vehicle is involved in a collision, and the active component causing the intervening component to move when the active component is activated wherein crush space for movement of the impact displaced component is at least partially cleared in the event of a collision.

19 Claims, 7 Drawing Sheets

SYSTEM AND METHOD FOR CLEARING CRUSH SPACE IN A VEHICLE THROUGH THE USE OF ACTIVE COMPONENTS

BACKGROUND OF THE INVENTION

1. Field of the Invention

This invention relates to a system for clearing crush space in a vehicle using active components and a method for using the system.

2. Background Art

Vehicle engine compartments are crowded with components. Crush space is clearance between a component, such as a powertrain component, and the passenger compartment that is designed to be compressed to absorb energy in a collision. During a frontal collision, for instance, components mounted in the engine compartment of a vehicle, or elsewhere, may move as the front end of the vehicle compresses or crumples. Components that move may be pushed into other vehicle components.

For example, the powertrain component of a vehicle does not compress in a collision, so crush space may be provided between the powertrain component and the passenger compartment. Vehicle frame and body components between the powertrain component and passenger compartment are designed to "crumple" to absorb the force of the impact as the powertrain component is forced toward the passenger compartment in a collision.

Applicants' invention addresses the problem of providing assembly locations in a vehicle for components while also providing crush space clearance.

SUMMARY OF THE INVENTION

In accordance with at least one aspect of the present invention, a system is provided for clearing crush space in an automotive vehicle. In a first embodiment, the system is provided in a vehicle having a passenger compartment. A component that may be displaced in a collision is assembled to the vehicle in a spaced relationship to the passenger compartment. An intervening component is mounted on the vehicle between the passenger compartment and the impact displaced component. An active component is secured to the vehicle in proximity to the intervening component. A controller activates the active component when the vehicle is involved in a collision. Activation of the active component moves the intervening component out of the crush space. As a result of this movement, crush space is cleared for movement of the impact displaced component.

In at least one implementation of this system, the system further comprises a sensor for detecting when the vehicle is involved in a collision. The sensor generates a signal that is provided to the controller when a collision is detected. The controller activates the active component in response to the signal. In a variation of this implementation, the sensor may be capable of determining the severity of a collision. The signal maybe generated by the sensor only when the severity of the collision exceeds a predetermined threshold.

In a further implementation, the active component may be a container that encloses a gas generator. In this implementation, the gas generator is activated to expand the container and cause the intervening component to move. The intervening component may be secured to the vehicle by a hinge area. The container may be arranged to apply torque to the intervening component when the container expands. The intervening component pivots about the hinge area in response to the torque applied by expansion of the container.

The intervening component may be mounted to the front of the passenger compartment and the vehicle may include an air bag system that determines whether the vehicle is involved in a frontal collision. The air bag system may be used to activate the active component when the air bag system determines that the vehicle is involved in a frontal collision.

In another embodiment of the present invention, a vehicle is provided that has a crush space for energy absorption in a collision. The vehicle includes a passenger compartment and an impact displaced component spaced apart from the passenger compartment by the crush space. An intervening component is disposed between the passenger compartment and the impact displaced component. An inflatable component is disposed between the passenger compartment and the impact shifted component. The inflatable component operatively engages the intervening component to move the intervening component when the inflatable component is inflated. The intervening component is moved to clear the crush space between the impact displaced component and the passenger compartment.

The inflatable component may be a container that encloses a gas generator. The inflatable component is inflated by activating the gas generator which expands the container, causing the intervening component to move.

The intervening component may be secured to the vehicle by a hinge area. The container applies torque to the intervening component when the container expands. The intervening component pivots about the hinge area in response to the torque applied by the container.

The impact displaced component moves along a path towards the passenger compartment during a collision. The inflatable component moves the intervening component in a direction away from the path. The inflatable component moves the intervening component during a collision event to inhibit the impact displaced component from pushing the intervening component into the passenger compartment. The inflatable component may move the intervening component completely out of the path so that the impact displaced component does not contact the intervening component during the vehicle collision event.

The intervening component may be, for example, a master cylinder and booster assembly. The impact displaced component may be, for example, a powertrain component.

A method of clearing crush space is provided for a vehicle having a passenger compartment, an impact displaced component, an intervening component, a sensor that detects a collision event, an active component and a controller. The method comprises the steps of detecting the collision event with the sensor and generating a collision event signal. The collision event signal is received at the controller which responds by activating the active component. The active component moves the intervening component from a design position in which the active component is located between the passenger compartment and the impact displaced component. The intervening component is moved to a cleared crush space position which is at least partially displaced from a position between the passenger compartment and the impact displaced component.

The active component may be an inflatable metal envelope. The step of activating the active component may comprise inflating the inflatable metal envelope. The intervening component may be, for example, a master cylinder and booster assembly. In this example, the master cylinder and booster assembly are moved by the inflated metal envelope. The impact displaced component may be, for example, a powertrain component. The master cylinder and booster assembly are moved to at least partially clear the crush space between the powertrain component and the passenger compartment. The master cylinder and booster assembly may be moved by the inflated metal envelope completely out of the path taken by the powertrain component as the powertrain component is shifted during a vehicle collision event.

The master cylinder and booster assembly may be connected to the vehicle by a hinge area. The master cylinder and the booster assembly may be pivoted about the hinge area.

The previously summarized features and other aspects of Applicant's invention will be explained more fully below with reference to the drawings.

DETAILED DESCRIPTION OF THE PREFERRED EMBODIMENT(S)

Reference will now be made in detail to the illustrated embodiments of the present invention which include the best modes of practicing the invention presently known to the inventors. The following descriptions are merely exemplary in nature and are in no way intended to limit the invention, its application, or uses. The figures are not necessarily drawn to scale. Specific details disclosed herein are not to be interpreted as limiting, but merely as a representative basis for any aspect of the invention and/or as a representative basis for teaching one skilled in the art to variously employ the present invention.

Figure 1:
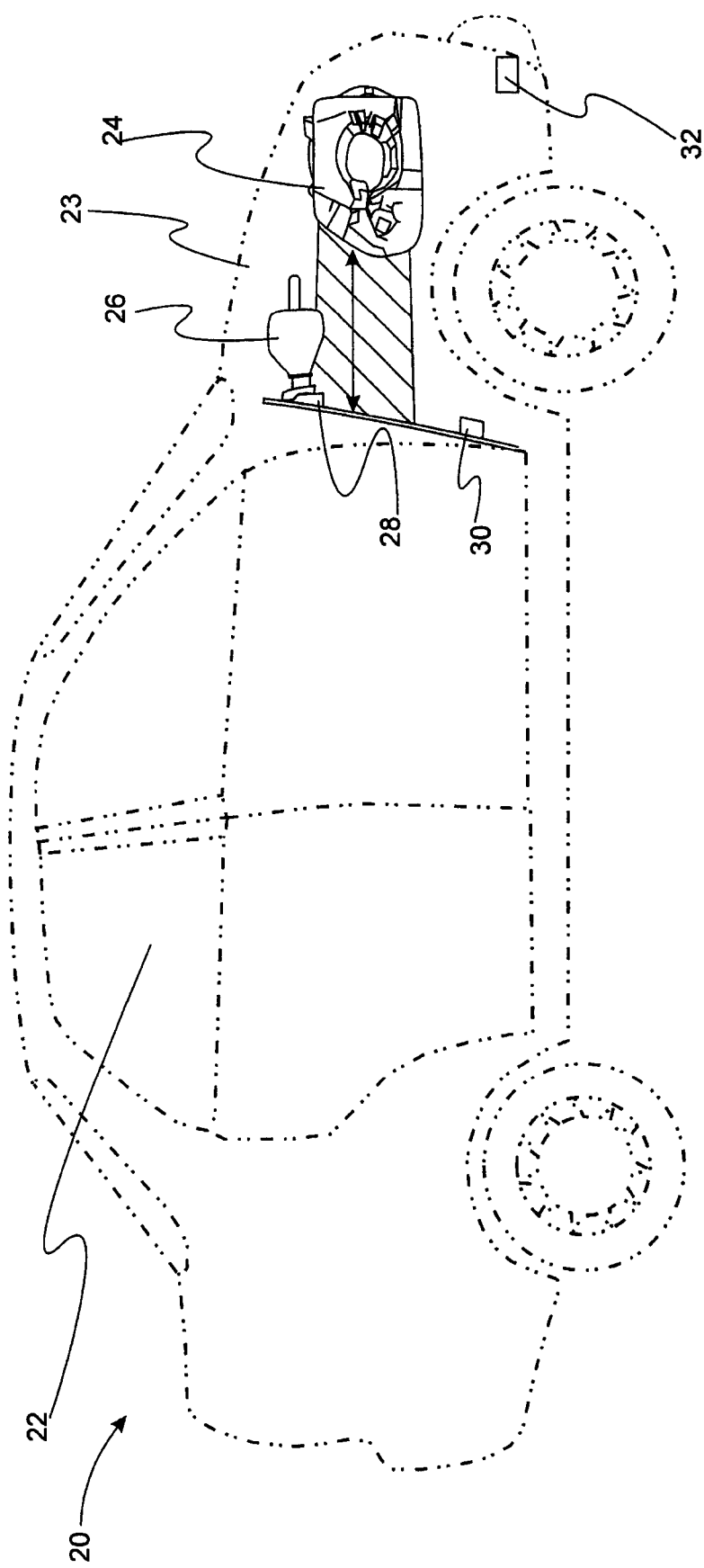
FIG. 1 is a diagrammatic side view of a vehicle equipped with a system for clearing crush space.

FIG. 1 illustrates a vehicle 20 equipped with a system for clearing crush space. Although the vehicle illustrated is an automobile, it should be understood that the system for clearing crush space can be used in any type of vehicle including, but not limited to, aircraft, watercraft, spacecraft and vehicles that travel on rails.

Vehicle 20 includes a passenger compartment 22 where passengers ride during vehicle operation that is designed to protect passengers during a collision. For this reason, automobiles may be designed so that portions of the vehicle (i.e., the engine compartment and the trunk) collapse or crumple in selected areas during a collision. This allows the vehicle to absorb energy and impact forces of the collision.

Vehicle 20 has an engine compartment 23 and an impact displaced component 24. The impact displaced component 24 is a component that is connected to the vehicle which may move from its normal operating position during a collision. The impact displaced component 24 may be a rigid member, such as a drivetrain component that tends to move as a result of a collision instead of being compressed. As illustrated in FIG. 1, impact displaced component 24 is hybrid-electric engine. Alternatively, the impact displaced component 24 may be any powertrain component such as an internal combustion engine or a transmission, or it may be any other component, for example, a battery, or power cell, and the like. The space between the impact displaced component 24 and the passenger compartment 22 is referred to herein as "crush space" and is represented in FIG. 1 by a shaded area. The crush space defines the distance that the impact displaced component 24 can travel during a collision before contacting the passenger compartment 22.

An intervening component 26 is also mounted in the engine compartment 23. Intervening component 26 is disposed between the impact displaced component 24 and the passenger compartment 22 and normally would obstruct the crush space. In the illustrated embodiment, the intervening component 26 is a booster and master cylinder assembly. Other examples of components that may be assembled in this area may be a battery, a fuse box, a support, an electric motor, a spare tire, or the like. If the impact displaced component 24 is moved during a front impact collision and pushed toward the rear of the vehicle 20, the impact displaced component 24 would be driven into the intervening component 26. The impact displaced component 24 could push the intervening component 26 towards the rear of the vehicle 20 towards the passenger compartment 22.

An active component 28 is mounted in the engine compartment 23 and may form part of the assembly connecting the intervening component 26 to the vehicle 20. In other embodiments, active component 28 may not be directly connected to intervening component 26, but rather, may be mounted near the intervening component 26. Additional structure or connecting members may be provided that operatively connect the active component 28 and the intervening component 26. In the illustrated embodiment, active component 28 is an inflatable structure of the sort shown and described in U.S. Pat. No. 7,124,851 issued to Smith et al. on Oct. 24, 2006. The active component 28 has a gas generator that inflates when triggered and is similar to an air bag generator. These types of inflatable structures inflate very rapidly. Pyrotechnic inflators may develop internal pressures ranging between 700 and 800 KPa. The inflatable structure may be an envelope shaped metal pocket that is preferably made from steel or aluminum. The metal envelope structure expands when exposed to the internal pressures produced by the inflator, and can inflate to many times their uninflated state. The inflatable structure may apply a substantial force to any object in its vicinity during inflation. Accordingly, when the active component 28 inflates, it pushes the intervening component 26 in an upward direction. In other configurations, active component 28 may push the intervening component 26 sideways, downwardly or in any other direction to at least partially move the intervening component 26 out of the path followed by impact displaced component 24 as it travels towards the passenger compartment 22 during a collision.

Alternatively, active component 28 may be any electronically controlled component, device or mechanism that is capable of rapidly exerting a force on the intervening component 26. For example, conventional air bags and stored energy devices of any sort may be used that can be triggered by a sensor that signals a controller 30.

A controller 30 may be mounted in the engine compartment or may be mounted elsewhere on the vehicle. The controller 30 causes active component 28 to inflate.

A sensor 32 is illustrated mounted proximate to a front bumper of vehicle 20. In other embodiments, sensor 32 may be mounted on a rear bumper, a body panel or frame component on the vehicle. Sensor 32 detects when a vehicle has been involved in a collision and may be a strain gage, piezo electric cell, or the like that is effective to detect a vehicle collision. In some embodiments, sensor 32 may be able to discern the type of collision event the vehicle has been involved in (i.e. frontal, rear, side or rollover). The sensor 32 may further be able to determine whether activation of active component 28 is necessary. For instance, activation of active component 28 may be necessary in a front impact collision but may not be necessary if vehicle 20 is struck from the rear. Multiple sensors 32 may be used to determine the type of collision that each provide signals to the controller 30.

In some embodiments, sensor 32 may be capable of discerning the severity of the collision and may determine whether activation of active component 28 is necessary based on that determination. For instance, sensor 32 may be able to consider a variety of factors including the speed of vehicle 20, the speed of any vehicle or object colliding with vehicle 20, the force of the impact, and whether impact displaced component 24 has become displaced among other factors. The sensor may be calibrated or specified to determine whether the impact forces are sufficient to dislodge impact displaced component 24 and whether activation of active component 28 is necessary. Alternatively, the determination of whether to activate active component 28 may be made by controller 30. In another embodiment, the controller 30 and the sensor 32 may be combined in a single assembly. During a collision, sensor 32 communicates with controller 30. Sensor 32 generates a collision event signal and communicate that collision event signal to controller 30. The collision event signal may be communicated by transmitting the signal by a wire, data bus, transmitting an RF signal, or the like.

Figure 2:
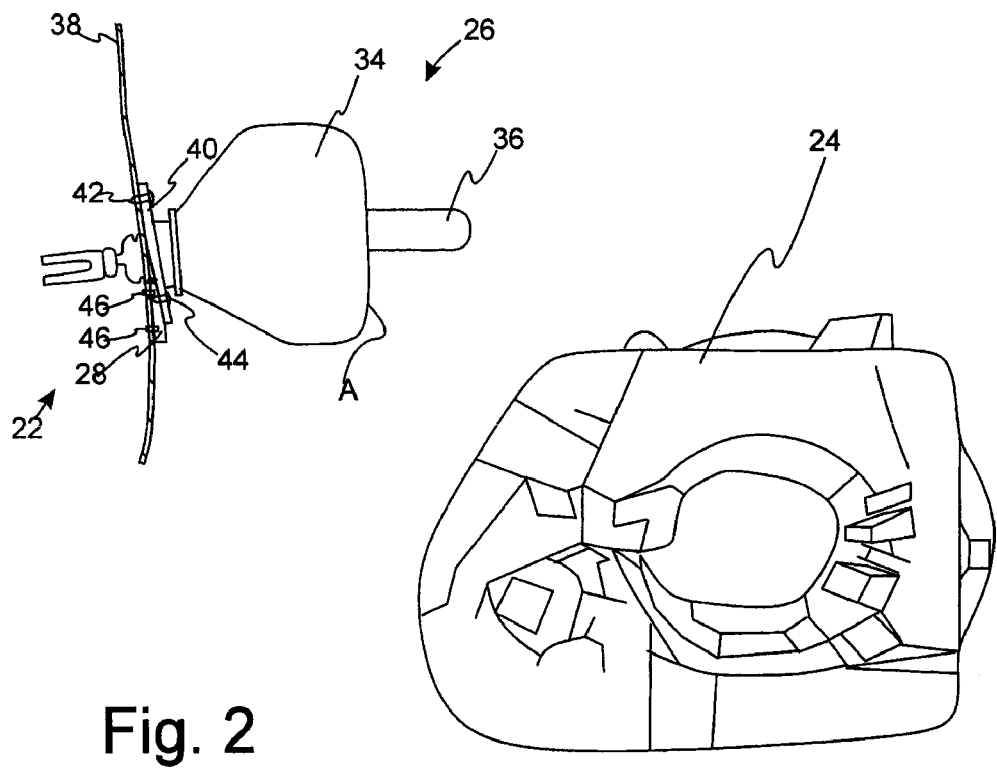
FIGS. 2-4 are simplified side views of a portion of the engine compartment of the vehicle of FIG. 1 illustrating in a sequence the movement of components of the vehicle during a frontal impact collision.

FIG. 2 is simplified side view of a portion of the engine compartment of the vehicle. In the illustrated embodiment, intervening component 26 comprises a booster 34 and a master cylinder 36 that assist the vehicle operator in applying the brakes and the impact displaced component 24 is a hybrid electric vehicle engine. The intervening component 26 is mounted directly to dash panel 38 by mounting plate 40 and a fastener 42 located proximate an upper portion of mounting plate 40. A lower portion of mounting plate 40 is mounted to active component 28 via fastener 44 which, in turn, is mounted to dash panel 38 via a fastener 46. In this configuration, intervening component 26 is partially connected to dash panel 38 by active component 28. Mounting plate 40 may be made from metal and may be bendable.

In the illustrated embodiment, when active component 28 is activated and expands, active component 28 impacts the intervening component 26. Intervening component 26 pivots upwards in a counterclockwise direction (from the perspective of FIG. 2) about a hinge area 43 (See FIGS. 3-5). The hinge area 43, shown in phantom lines in FIGS. 3-5 refers to an area that deforms as a result of activation of active component 28. In the illustrated embodiment, the mounting plate 40 bends to allow the intervening component 26 to deform. In other embodiments, the dash panel 38 may deform. Alternately, a mechanical hinge may be employed. A bending feature 45 may permit a rod that connects the vehicle's brake pedal to the master cylinder to either bend or to disconnect to prevent any movement of the brake pedal during an impact while allowing the booster and master cylinder assembly 26 to rotate.

In the event of a frontal impact collision, sensor 32 detects the collision and communicates with controller 30 which, in turn, activates active component 28. An activation sequence is shown in FIGS. 2-4.

Figure 3:
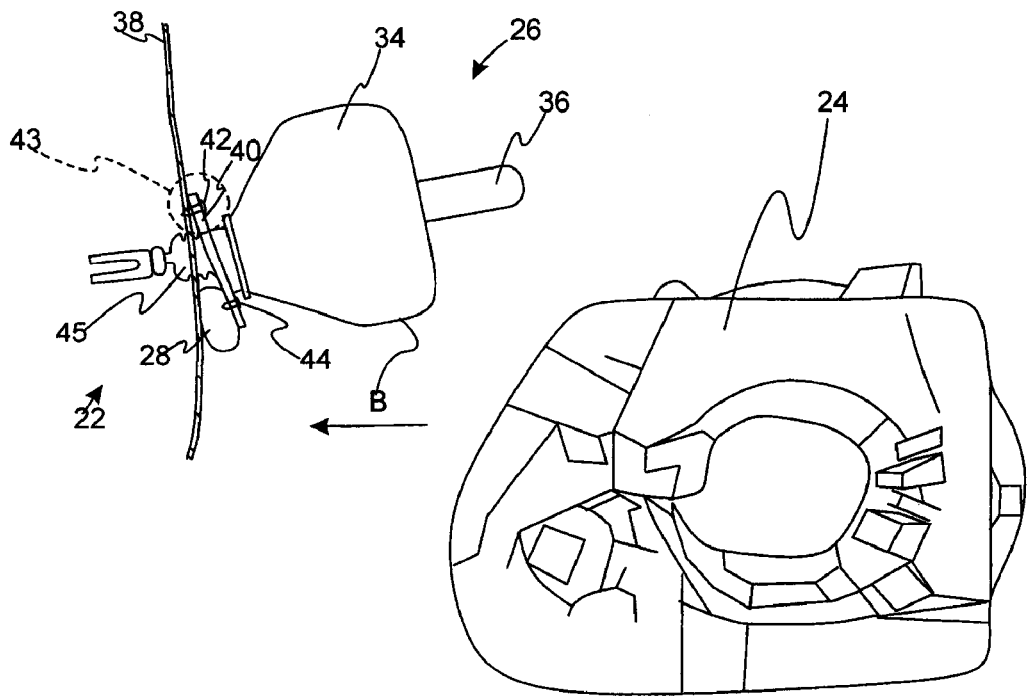

As shown in FIG. 3, impact displaced component 24 has begun to move rearward towards dash panel 38 under the forces of the collision. Active component 28 is illustrated in its activated state with the metal envelope 49 (see FIGS. 7 and 8) shown fully inflated. The activation of active component 28 causes intervening component 26 to rotate in a counterclockwise direction (with respect to FIG. 3). In the embodiment illustrated in FIGS. 3-4, inflation of active component 28 does not move intervening component 26 entirely out of the path followed by the impact displaced component 24. Rather, the inflation of active component 28 shifts intervening component 26 upward causing a bottom portion of intervening component 26 to be oriented to be contacted at a bottom portion by impact displaced component 24.

Figure 4:
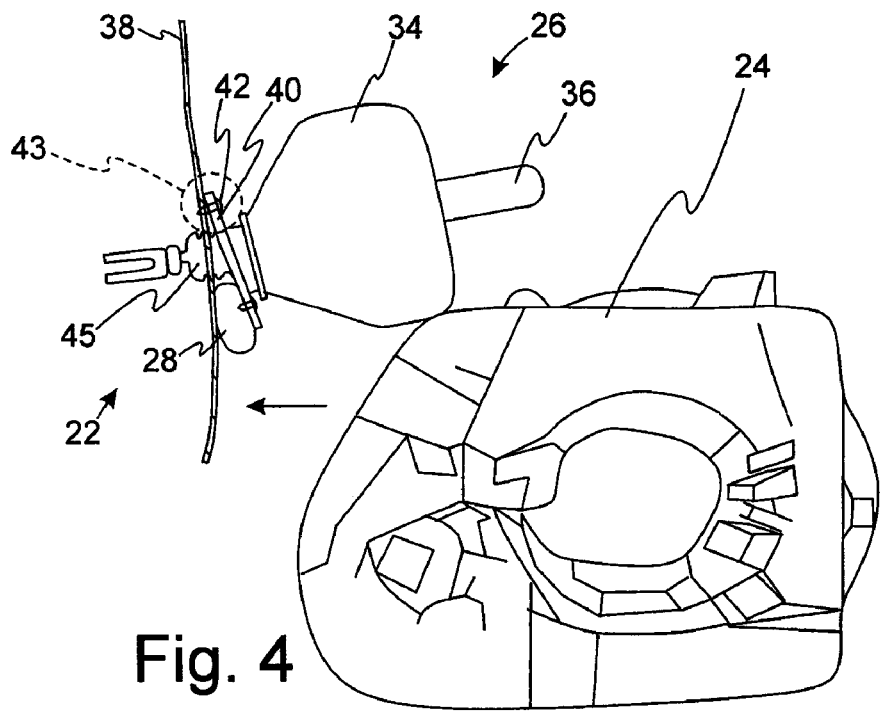

Referring to FIG. 4, impact displaced component 24 continues to move in a rearward direction after contacting intervening component 26. The angled orientation of the bottom surface of intervening component 26 functions as a camming surface when contacted by the impact displaced component 24. Impact displaced component 24 causes intervening component 26 to pivot upwardly about the pivot connection 42. Contact between the impact displaced component 24 and the intervening component 26 merely deflects the intervening component 26 upwardly, partially clearing the crush space.

Figure 5:
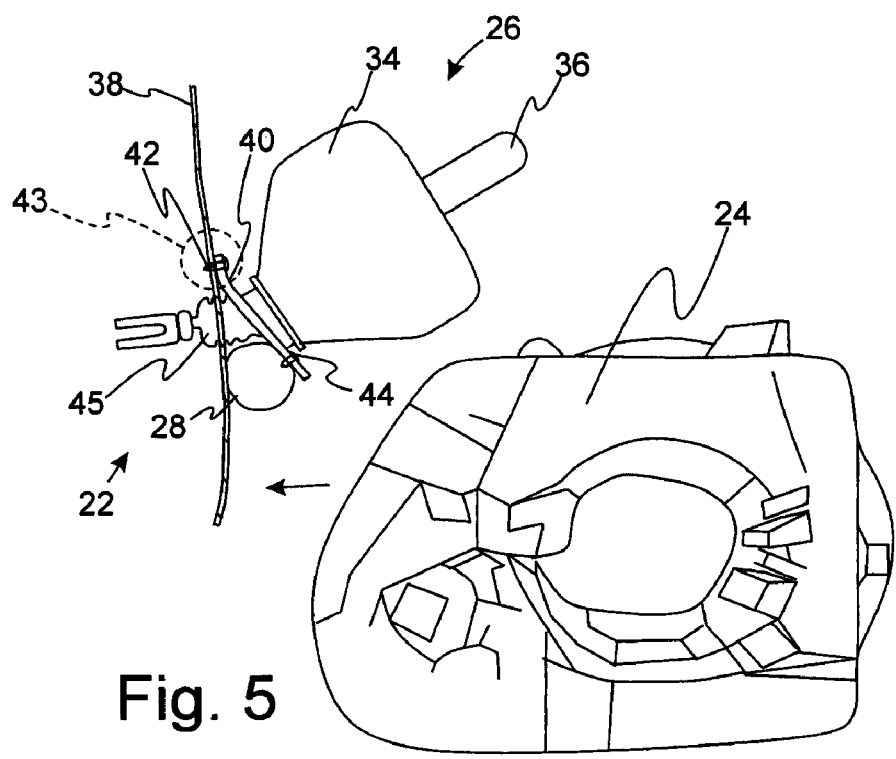
FIG. 5 is a simplified side view of the components shown in FIG. 3 during a later stage of the collision in a vehicle equipped with an alternate embodiment of the system for clearing crush space.

FIG. 5 illustrates an alternate embodiment wherein the active component 28 moves the intervening component 26 sufficiently upward to avoid any contact with impact displaced component 24 during a collision.

Figure 6:
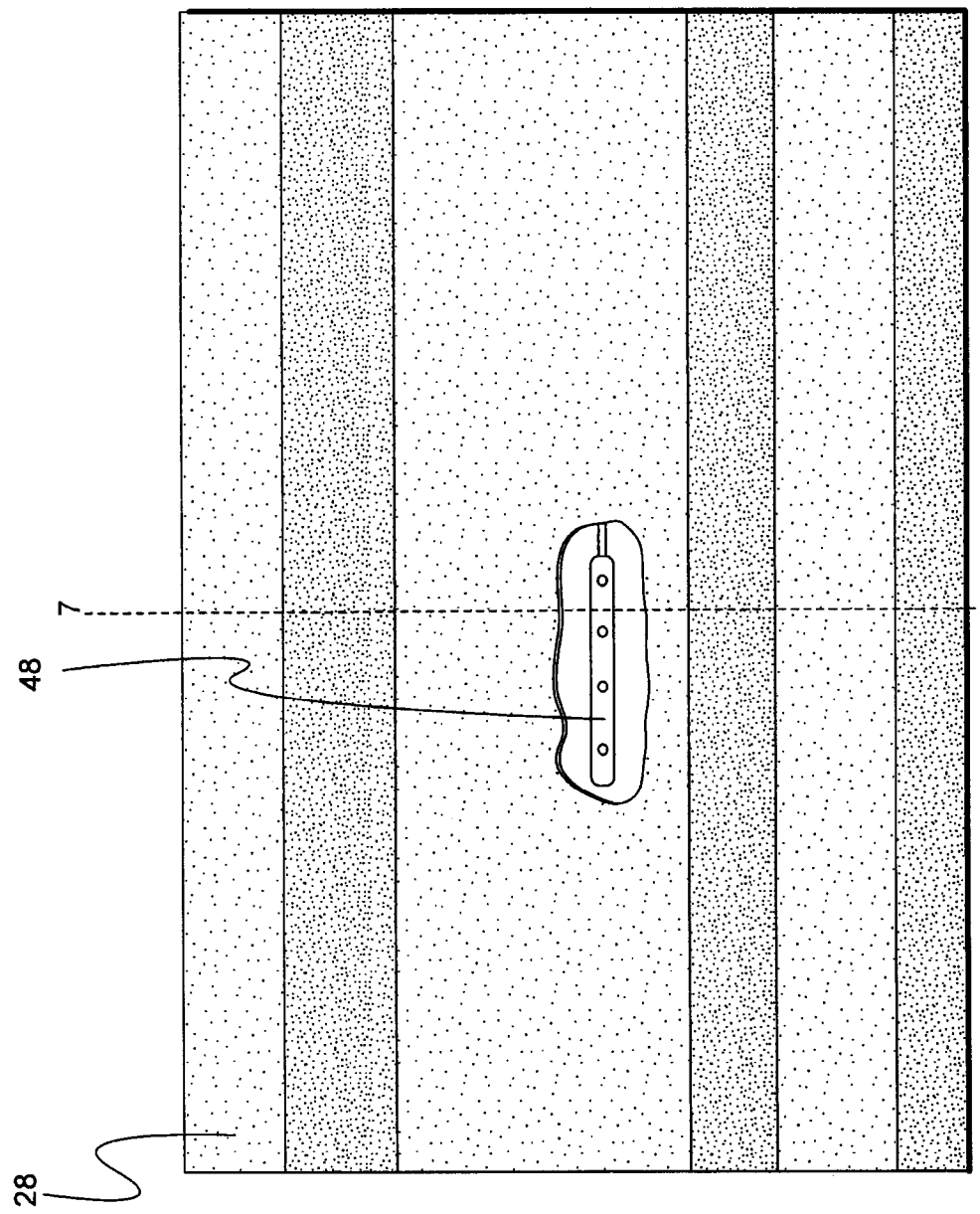
FIG. 6 is a cutaway plan view of an active component.
Figure 7:
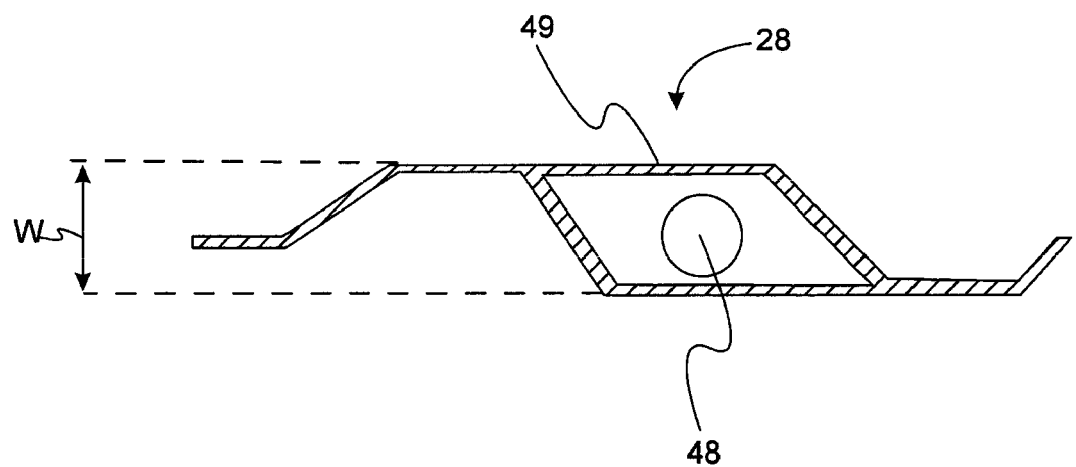
FIG. 7 is a cross-sectional view taken along the line 7-7 of FIG. 6.
Figure 8:
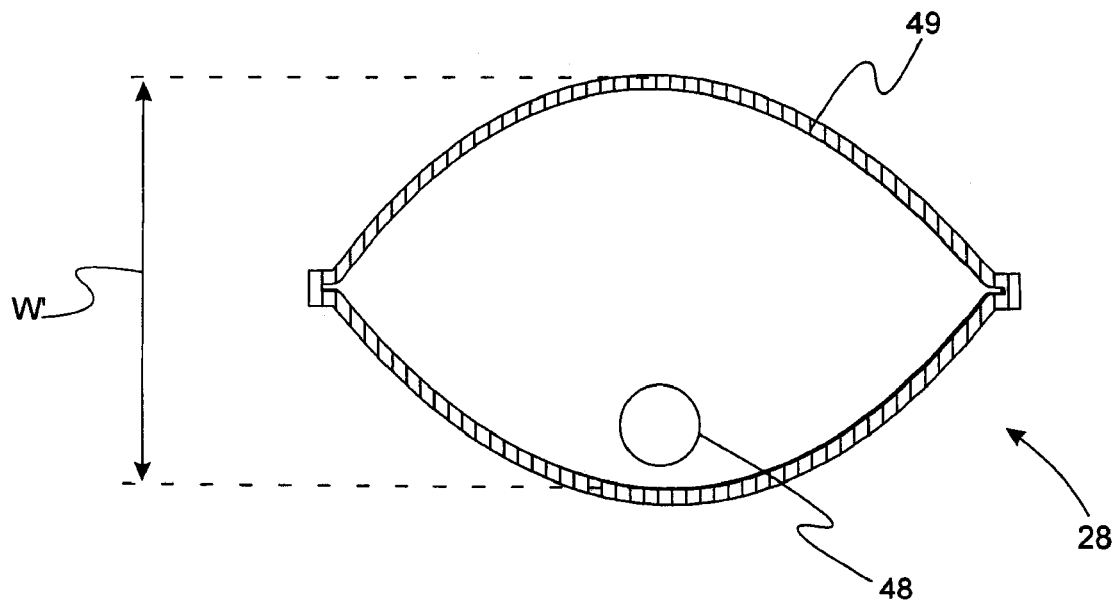
FIG. 8 is a cross sectional view analogous to FIG. 7 of the active component subsequent to activation.

FIGS. 6-8 show an embodiment of active component 28. In these figures, active component 28 is an inflatable structure. As illustrated in FIG. 6, a portion of the top surface of active component 28 is cutaway to reveal a pyrotechnic inflator 48 inside a hollow portion of the inflatable structure. The pyrotechnic inflator 48 discharges to fill the hollow portion of the inflatable structure with high pressure gas that causes the metal structure to inflate and enlarge. FIG. 7 shows a cross-section of active component 28 prior to inflation having a width W. FIG. 8 illustrates the cross-section shown in FIG. 7 after inflation, active component 28 having width W'. In some embodiments, W' can be four times larger than W. In other embodiments, the difference between W and W' can be lesser or greater.

Figure 9:
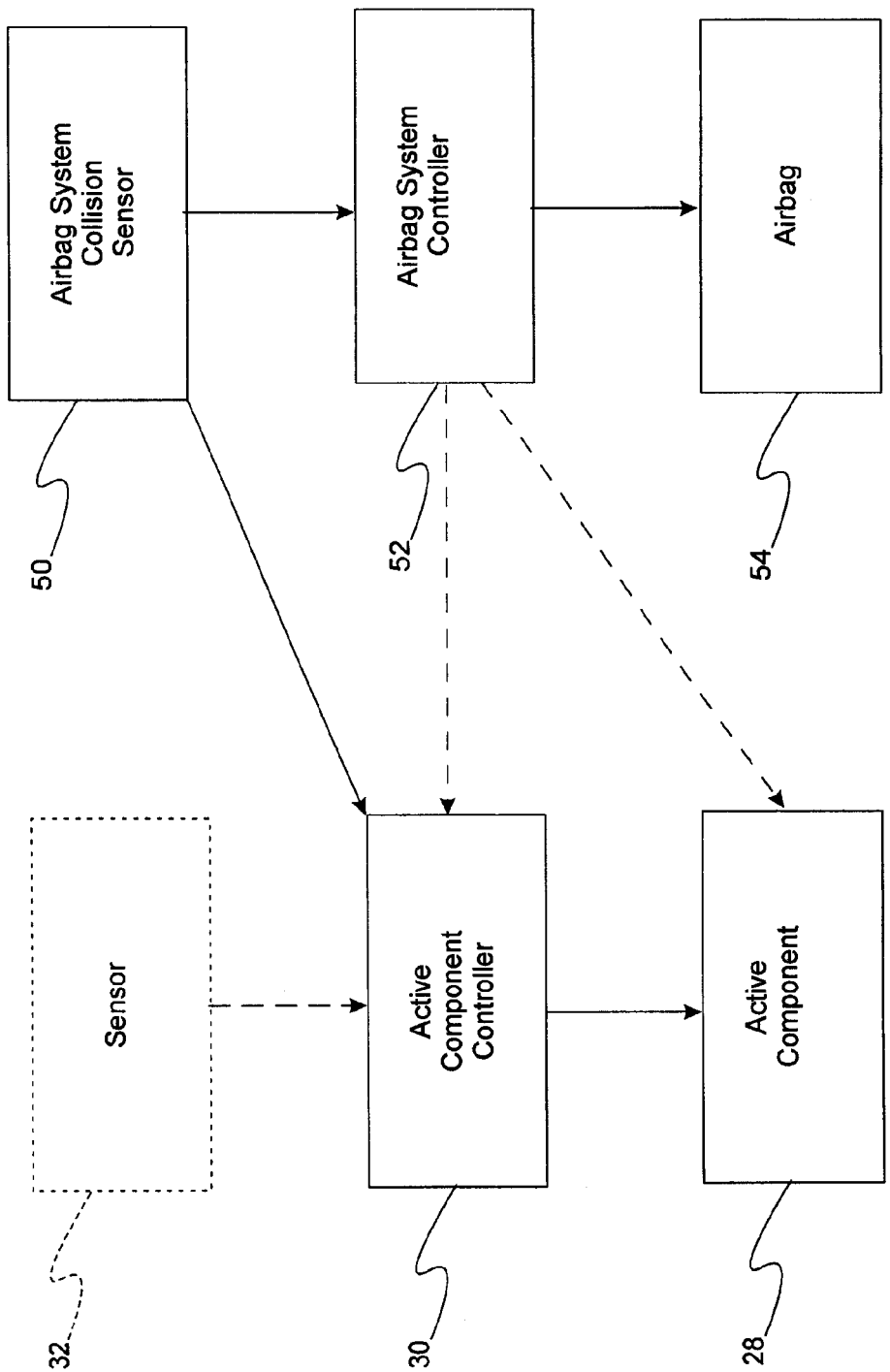
FIG. 9 is a schematic view showing an embodiment of a system made in accordance with the present invention.

FIG. 9 is a schematic view showing the elements of an embodiment of a system for clearing crush space. As illustrated, the system comprises an active component controller 30 and an active component 28. The system uses air bag system collision sensor 50 from an air bag system further comprising an air bag system controller 52 and an air bag 54. In an alternate embodiment, shown in phantom lines, the system for clearing crush space includes a dedicated sensor 32 which may be used by the system, either instead of, or in addition to, the air bag system collision sensor 50. In at least another alternate embodiment, the air bag system controller 52 can provide a signal to the active component controller 30. This is indicated in FIG. 9 in phantom lines. In another alternate embodiment, air bag system controller 52 can activate active component 28. This is shown in phantom lines in FIG. 9.

Figure 10:
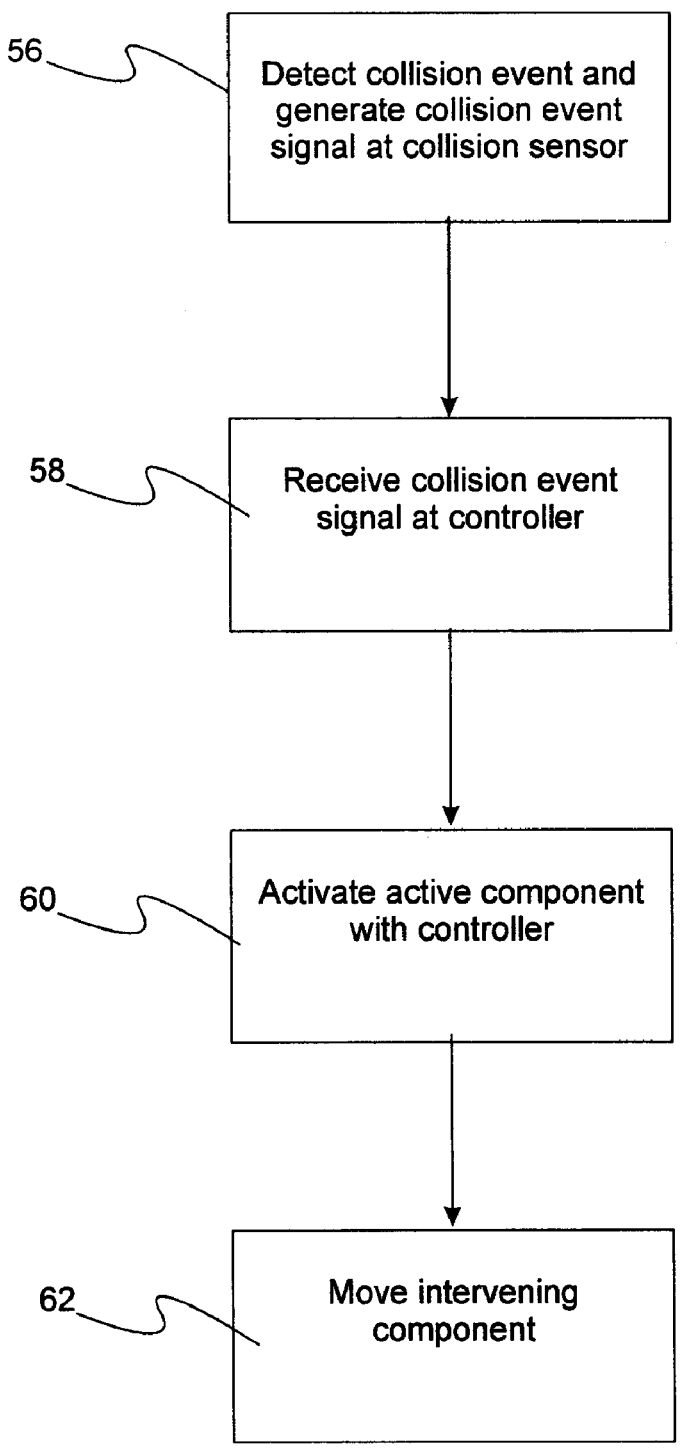
FIG. 10 is a flowchart illustrating an embodiment of the method of the present invention.

FIG. 10 is a flowchart showing the various steps of an embodiment of the method of the present invention. A first step 56 is detecting a collision event and generating a collision event signal. This step may be accomplished with a sensor 32, an air bag collision sensor 50, or through some other means. Step 58 may include receiving the collision event signal by controller 30. At step 60, the active component 28 is activated by controller 30 activating an active component 28 such as an inflatable structure. At step 62, the intervening component 26 is moved at least partially out of the path between the impact displaced component 24 and the dash panel 38, thus at least partially clearing the crush space. Alternatively, the intervening component can be fully cleared from the crush space as shown in FIG. 5.

While the best mode for carrying out the invention has been described in detail, those familiar with the art to which this invention relates will recognize various alternative designs and embodiments for practicing the invention as defined by the following claims.

What is claimed:

1. A system for clearing crush space in an automotive vehicle, the system comprising:
   a vehicle having a passenger compartment;
   an impact displaced component assembled to the vehicle in a spaced relationship to the passenger compartment;
   an intervening component mounted on the vehicle between the passenger compartment and the impact displaced component;
   an active component secured to the vehicle proximate the intervening component,
   a controller mounted on the vehicle, the controller activating the active component when the vehicle is involved in a collision; and
   the active component causing the intervening component to move when the active component is activated wherein crush space for movement of the impact displaced component is at least partially cleared in the event of a collision.

2. The system of claim 1 further comprising a sensor connected to the vehicle, the sensor detecting when the vehicle is involved in a collision, the sensor generating a signal that is provided to the controller, the controller activating the active component in response to the signal.

3. The system of claim 2 wherein the sensor is capable of measuring the severity of the collision and wherein the sensor generates the signal only when the severity of the collision exceeds a predetermined threshold.

4. The system of claim 1 wherein the active component is a container that encloses a gas generator, wherein activating the active component further comprises activating the gas generator which expands the container thereby causing the intervening component to move.

5. The system of claim 4 wherein the intervening component is secured to the vehicle by a hinge area, wherein the container applies torque to the intervening component when the container expands, and wherein the intervening component pivots about the hinge area in response to the torque applied by the container.

6. The system of claim 1 wherein the intervening component is mounted in front of the passenger compartment, wherein the vehicle further includes an air bag system that determines whether the vehicle is involved in a frontal collision, wherein the air bag system activates the active component only when the air bag system determines that the vehicle is involved in a frontal collision.

7. An automotive vehicle having a crush space for energy absorption in a collision, the vehicle comprising:
   a passenger compartment;
   an impact displaced component spaced apart from the passenger compartment by the crush space;
   an inflatable component disposed between the passenger compartment and the impact displaced component; and
   an intervening component disposed between the passenger compartment and the impact displaced component and proximate to the inflatable component, the inflatable component operatively engaging the intervening component to move the intervening component when the inflatable component is inflated, wherein crush space between the impact displaced component and the passenger compartment is at least partially cleared of obstruction.

8. The vehicle of claim 7 wherein the inflatable component is a container that encloses a gas generator, wherein inflating the inflatable component further comprises activating the gas generator which expands the container thereby causing the intervening component to move.

9. The vehicle of claim 8 wherein the intervening component is secured to the vehicle by a hinge area, wherein the container applies torque to the intervening component when the container expands, and wherein the intervening component pivots about the hinge area in response to the torque applied by the container.

10. The system of claim 7 wherein the impact displaced component moves along a path towards the passenger compartment during a collision, and wherein the inflatable component moves the intervening component in a direction away from the path.

11. The vehicle of claim 10 wherein the inflatable component moves the intervening component during a collision to inhibit the impact displaced component from pushing the intervening component into the passenger compartment.

12. The vehicle of claim 10 wherein the inflatable component moves the intervening component completely out of the path such that the impact displaced component does not contact the intervening component during a vehicle collision.

13. The vehicle of claim 7 wherein the intervening component is a master cylinder and booster assembly and wherein the impact displaced component is a powertrain component.

14. A method of clearing crush space in an automotive vehicle having a passenger compartment, an impact displaced component, an intervening component, a sensor that detects a collision event, an active component and a controller, the method comprising the steps of:
   detecting the collision event with the sensor and generating a collision event signal;
   receiving the collision event signal at the controller;
   activating the active component in response to the controller receiving the collision event signal; and
   moving the intervening component with the active component from a design position wherein the active component is located between the passenger compartment and the impact displaced component to a cleared crush space position wherein the intervening component is at least partially displaced from a position between the passenger compartment and the impact displaced component.

15. The method of claim 14, the active component being an inflatable metal envelope, wherein the step of activating the active component comprises inflating the inflatable metal envelope.

16. The method of claim 15, the intervening component being a master cylinder and booster assembly, wherein the step of moving the intervening component comprises moving the master cylinder and booster assembly with the inflated metal envelope.

17. The method of claim 16, the impact displaced component being a powertrain component, wherein the step of moving the master cylinder and booster assembly to the cleared crush space position at least partially clears the crush space between the powertrain component and the passenger compartment.

18. The method of claim 17 wherein the master cylinder and booster assembly is moved by the inflated metal envelope completely out of a path taken by the powertrain component as the powertrain component is shifted during a vehicle collision.

19. The method of claim 16, the vehicle further comprising a hinge area and the master cylinder and booster assembly being connected to the vehicle by the hinge area, wherein the step of moving the master cylinder and booster assembly further comprises pivoting the master cylinder and booster about the hinge area.

* * * * *